Figure 1:
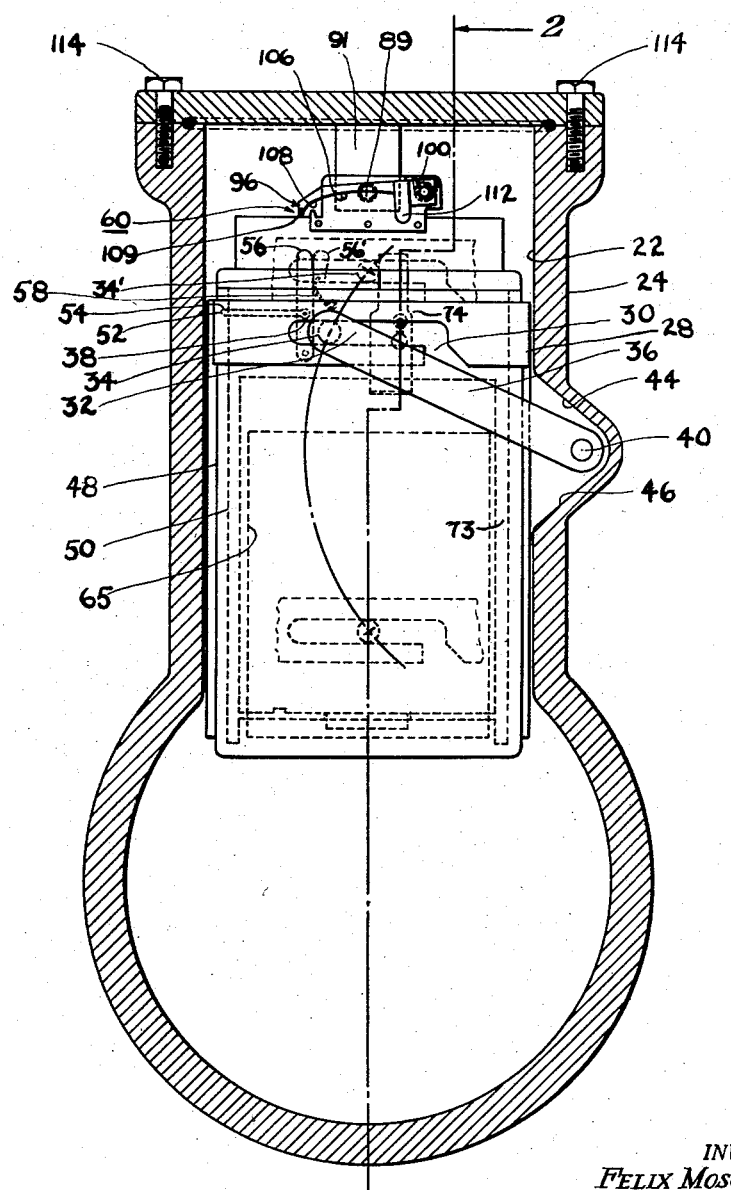

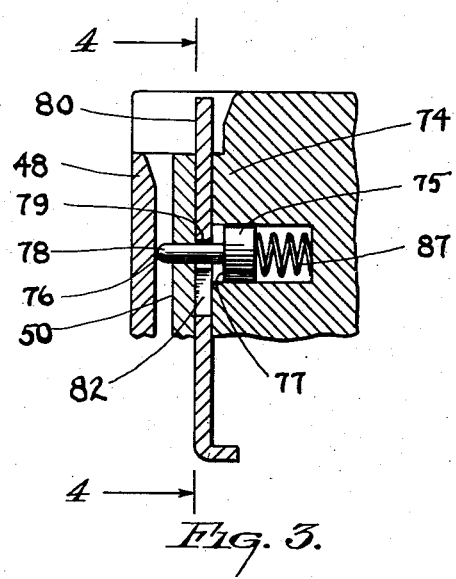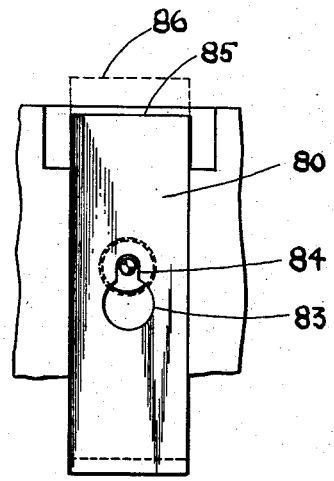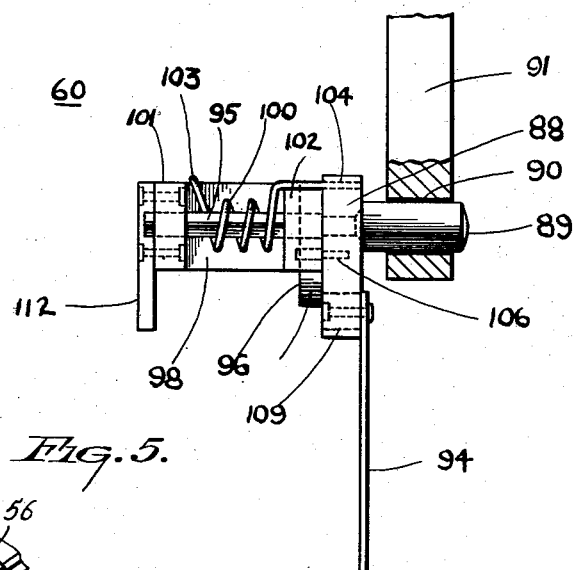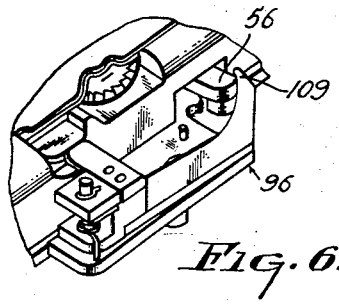
INVENTOR.
FELIX MOSCATELLI
AGENT.

United States Patent Office 2,857,521
Patented Oct. 21, 1958

2,857,521

ELECTRON MICROSCOPE ATTACHMENT

Felix Moscatelli, White Plains, N. Y., assignor to North American Philips Company, Inc., New York, N. Y., a corporation of Delaware Application October 25, 1955, Serial No. 542,626

5 Claims. (Cl. 250—49.5)

This invention relates to an electron microscope and more particularly to a camera attachment for such a microscope.

Electron microscopes are generally used to provide a means for magnifying an image of extremely small samples to be investigated up to about 60,000 diameters. This is accomplished by placing a sample in one end of the microscope near an electron-emitting source. The other end of the microscope opposite the sample is generally provided with a viewing screen which fluoresces when irradiated by impingement of electrons thereon for showing an enlarged image of the sample. The air in the microscope is then evacuated until a reduced pressure approaching a vacuum exists. Accordingly, when electrons from the electron emitting source go through the sample, a clear picture of the sample i. e. the physical boundaries of the sample, is projected on the screen of the microscope. Suitable magnification of the image is obtained by controlling the direction of the paths of the electrons by placing magnification coils (corresponding to lenses in an optical microscope) around the cone of electrons which go through the sample.

A photograph may, of course, be taken of the picture on the screen; however, more accurate measurement of the sample may be obtained by directly taking a picture of the image without using the intermediate screen. This may be accomplished by interposing a photographic film plate somewhere in the electron beam in the microscope between the sample and the screen. Applicant's camera attachment to the electron microscope however, is placed on the front end of the microscope in order to obtain maximum direct magnification.

Accordingly, a principal object of the invention is to provide a novel camera attachment for the front end of an electron microscope which may be conveniently operated under a reduced pressure approaching that of a vacuum so that a series of photographic plates may be sequentially exposed without breaking the vacuum seal.

Another object is to provide a camera attachment which can be mounted on an electron microscope for directly producing magnified images up to 100,000 × of an electron-bombarded sample without resorting to the use of auxiliary apparatus for enlarging the photographic negative.

A further object is to provide a camera attachment which records substantially the same magnified image of an electron-bombarded sample as that seen on a fluorescent screen mounted on the front end of an electron microscope.

An additional object is to provide a structure whereby an automatic cassette may be used which prevents double exposure of photographic plates contained therein.

Figure 2:
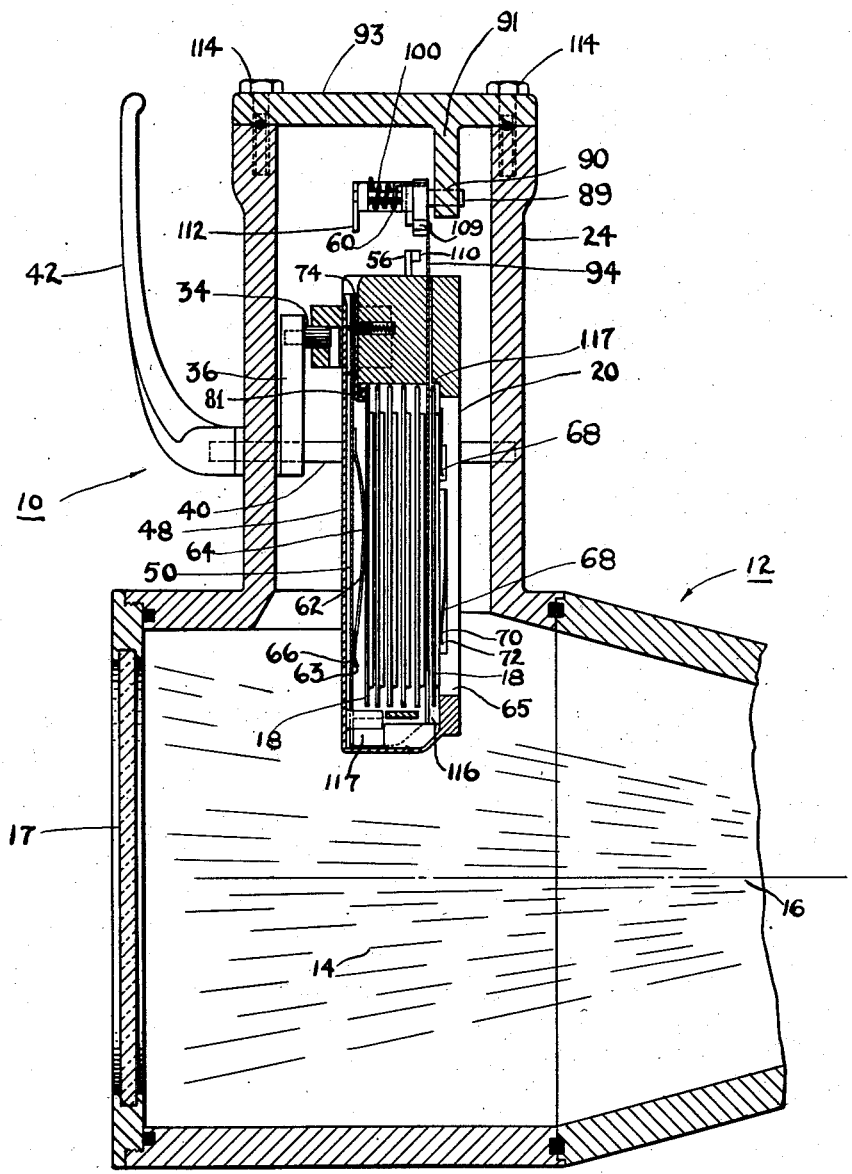

The above and other features, objects and advantages of the present invention will be fully understood from the following description considered in connection with the accompanying illustrative drawing in which:

Fig. 1 is an elevational view of a front-end camera for an electron microscope,

Fig. 2 is a side view of the front-end camera and the front end of an electron microscope taken along the lines 2—2 of Fig. 1, Fig. 3 is an enlarged view of the release mechanism, of Fig. 2, Fig. 4 is a sectional view of Fig. 3 along the plane 4—4, Fig. 5 is an enlarged view of the escape mechanism of Fig. 2; and Fig. 6 is a partial perspective view of part of the escape mechanism disclosed in Fig. 1.

Referring more particularly to the drawings wherein similar reference characters designate corresponding parts throughout the several views, the device embodying the invention comprises a front-end camera 10 for photographically recording the magnified image of a sample (not shown) which has been irradiated by a beam of electrons in an electron microscope 12. A cone-shaped electron beam 14 (Fig. 2) having a central axis 16 represents those electrons which have passed through the sample and which, if recorded, show a magnified shadowgraph of the sample in fluorescent screen 17. Magnification is accomplished by coils (not shown) which cause the electron beam to diverge in a conical shape as it leaves the sample.

Recording of the image of the sample is accomplished by means of camera 10 and specifically by a photographic plate 18 which is placed in the cone 14 of electrons at right angles to the central axis 16 of the electrons emanating from the sample.

When a series of exposures are desired, a plurality of photographic plates are preferably utilized in a cassette 20 mounted in camera 10. The function of the cassette 20 is to act as a film holder which can reposition an exposed film plate and also present an unexposed film plate for a subsequent exposure.

The cassette 20 is mounted in the camera 10 and slides on guides 22 provided on the inner wall of housing 24. The mechanism used to impart the sliding motion of the cassette toward and away from the central axis 16 of the cone includes a band 28 which is secured to the outer surface of cassette 20. Band 28 has two joined slots 30 and 32 on one of the sides of the band. Slot 30 is used to receive a cam 34 on a lever arm 36 and the other slot 32 provides surfaces 38 against which the cam 34 may be urged to move band 28 and consequently also the cassette 20 in the desired direction. The lever arm 36 is pivotally mounted inside the camera housing 24 by a pin 40 which extends through the side of housing 24. A handle 42 is fastened to the end of pin 40 for pivotally turning lever arm 36 on pin 40. Surfaces 44 and 46 in the side of the housing act as stops to limit the travel of lever arm 36 and also the position of cassette 20. The position of the pin 40, the length of the slot 32, and the lever arm 36 are suitably chosen so that a photographic plate 18 in the cassette 20 can be extended into the normal position, i. e. in a position transverse to the axis of the electron cone, and can also be retracted into housing 24.

Cassette 20 has two main compartments, an outer compartment 48 and an inner compartment 50 which fit inside one another and which can be locked together by a bolt or pin 52 which extends from the side of the inner compartment 50 into an aperture 54 in the outer compartment. The operation of bolt 52 in either engaging or disengaging these compartments is controlled by a latch 56 which is operatively connected with the bolt 52. A spring 58 also mounted on the inner compartment 50 urges latch 56 toward the closed position which is indicated by the solid line 56 in Fig. 1 while the dotted outline of latch 56 indicates the position of the latch in its open position during which the spring tension in spring 58 is overcome and the inner and outer compartments are free to slide within one another.

The latch 56 is moved to the position represented by the dotted line 56' when the cassette is retracted in an upward direction, i. e. in a direction toward the top of the drawing of Fig. 1, into engagement with an escape mechanism 60. When latch 56 is rigidly engaged with the escape mechanism 60, which in turn is rigidly connected to the housing 34 of the camera, the movement of lever arm 36 causes a relative movement of the inner and outer compartments 48 and 50 respectively.

This relative movement is necessary to reposition a plurality of photographic films in the inner compartment 48 by a series of steps to be explained hereinafter. Cassette 20 also includes springs 62 and 68 respectively which are mounted on the inside of the cassette to urge against and also help to reposition the photographic plates 18 in the inner compartment 48.

Spring 62 is mounted on one of its ends 63 to the inner wall surface of compartment 50 and has a curved portion 64 for engaging the photographic plates 18 and urging them in a direction toward the opening 65 in the inner compartment. The end 63 of spring 62 is preferably mounted in a recess 66 on the inner side wall of compartment 50 so that photographic plates 18 may slide past this point without being obstructed in their movement. Spring 62 is made of thin brass or any spring material so that the curved portion 64 may be readily depressed to accommodate a plurality of photographic plates in the inner compartment 50.

The springs 68 are each mounted on one of their ends to an inner wall of the outer compartment 48. The other end 70 of these springs 68 are curved toward the inner compartment 50. Each end 70 of springs 64 has a tab 72 (Fig. 1) which bears against and is depressed by the edges 73 of the inner compartment. When the inner compartment is pulled out of the outer compartment, the ends 70 of springs 68 move behind the inner compartment as it is withdrawn. If a photographic plate is positioned where the separate plate is located as shown in the right side of Fig. 2, the springs 68 will urge this plate toward the left side of the outer compartment as the inner compartment is withdrawn from the outer compartment.

The inner compartment of the cassette also includes a release mechanism 74, see Figs. 2, 3 and 4, which is put into operation when one end of an exposed photographic plate 18 urges against one of the members of this mechanism. The release mechanism includes a cylindrical body 75 having at least two stop surfaces 76 and 77, preferably surfaces formed on two different diameters on the body. The body 75 is spring-urged on the side of the inner compartment so that a part 78 of the body projects through an aperture 79 in the side wall of the inner compartment 50. A flat slide member 80 with an elongated slot 82 having at least two dimensions 83 and 84 corresponding to the diameters of the cylindrical body 75 is mounted on the cylindrical body. In order to extend the slide member 80 from its retracted position shown by the solid line 85 to the extended position shown by the dotted line 86, the cylindrical body 75 must be depressed against the action of spring 87. This is effected by engagement of the outer compartment 50 in its movement from the extended position to the retractor position. The depression of the cylindrical body 75 allows the slide member to be freely moved in an upward movement by the top of a photographic plate engaging the lower curved portion of slide member 80.

An additional mechanism co-operates with the cassette 20 in the repositioning of the photographic plates 18. This mechanism is the escape mechanism 60 previously referred to which is mounted above the cassette in the inside of the camera housing as shown in Figs. 1, 2 and 5. The escape mechanism has a mounting plate 88 with a projection 89 extending laterally for engaging with the aperture 90 in a supporting plate 91 depending downwardly from the top plate 93 of the housing. A guide plate 94 or separating plate 94 is connected to the bottom of the mounting plate 88 and a pin 95 connected to the side of the mounting plate 88 extends in a plane transverse to the plane of the plate. A finger-shaped member 96 is pivotally mounted on the pin and a U-shaped member 98 journalled through the pin is rigidly secured to the finger-shaped member. A spring 100 is wound around the pin between the legs 101 and 102 of the U-shaped member. One end 103 of the spring is attached to the bight of the U-shaped member and the other end 104 is attached to the mounting plate 88 to urge the finger-shaped member 96 into a predetermined position. Another pin 106 secured to the mounting plate 88 limits the free movement of the finger-shaped member 96. The surface 108 of the finger-shaped member 96 is curved so that engagement of the catch 56 with it will cause the displacement of the latch. Accordingly, the spring tension and leverage of the finger-shaped member 96 are selected so that they will overcome the spring tension and leverage of latch 56 when the latch is forced into engagement with finger member 96. A projection 109 in mounting plate 88 is engageable over the latch 56 so that these two parts may be rigidly joined.

In order to disengage these parts an extension 112 on the finger-shaped member 96 and located adjacent the pivot of the U-shaped member 98 can be engaged with the slide member 80 when it is in its extended position. The result of the extension of the slide member 80 is that the spring tension of spring 100 is overcome and the latch 56 is disengaged from projection 109 on the mounting plate 88 by the action of spring 58.

The operation of the camera is as follows:

The cassette 20 is loaded with photographic plates 18 before the cassette is inserted in the housing 24. First, latch 56 is preferably manually depressed to unlatch the outer and inner compartments 48 and 50. Then, outer compartment 48 is almost completely disengaged from the inner compartment by holding the outer compartment stationary and withdrawing the inner compartment 50. Next, guide 94 is withdrawn from the inner compartment. The separation of these compartments provides an opening (not shown) so that the plates 18 may be inserted into this opening and arranged parallel with one another in the inner compartment 50. If for example five film plates are inserted therein, the combined thickness of the plates should not exceed the space between spring 62 in its depressed position and the position of the guide 94 when it is inserted into the inner compartment 50. Finally, the plates 18 are held in position against the action of spring 62 and the guide 94 inserted in inner compartment 50 so that all of the plates are contained between spring 62 and guide 94. The cassette is now loaded and ready to be inserted into the housing of the front end camera.

The top plate 93 is removed from the camera 10 and projection 89 inserted in aperture 90 in supporting plate 91.

Next, the handle 42 is turned so that lever arm 36 engages stop surface 44 and cam 34 is located in the position shown by the dotted circle 34. As the band 28 on the cassette 20 is caused to descend into the housing 24, cam 34 engages the sides of opening 30 in band 28. The top plate 93 is then secured to the housing 24 by screws 114.

After the air in the microscope has practically all been evacuated the camera is ready to take a picture of the electron image of a sample in the microscope.

By merely turning handle 42, the cassette may be moved into an extended position so that the cassette 20 and hence the photographic plates intercept the cone-shaped electron beam preferably at right angles to its central axis. The cassette 20 is moved into a fully extended position i. e. a normal position so that the plates 18 in the inner compartment are no longer held in position by guide 94, but are urged to the right side of the inner compartment as shown in Fig. 2 due to the tension in spring 62. The photographic plate to be exposed is urged against the inner right hand wall of outer compartment 48. In this position, all of the plates are parallel with one another and there is no danger of exposing more than just the one plate adjacent the opening 65 in the outer compartment.

After being exposed, the photographic plate must be repositioned so that another plate may take its place.

By moving the handle 42 in the opposite direction the cassette 20 may be retracted into housing 24. In so doing the guide 94 moves behind the exposed plate separating it from the unexposed plates as shown schematically in Fig. 2.

When the cassette 20 moves into its fully retracted position, latch 56 engages the curved surface 108 of the finger-like member 96. The curved surface 108 acts as a guide to move the latch 56 from position 56 to 56' as seen in Fig. 1 i. e. to an unlatched position. Projection 109 on mounting plate 88 is then insertable over the end of latch 56 and is held in this position by the action of member 96. The outer compartment 48 is now free to move into the normal position while the inner compartment 50 remains in the retracted position.

As the handle is moved again, only outer compartment 48 with the exposed photographic plate moves to the normal position leaving the inner compartment with the four unexposed plates in the retracted position.

The exposed photographic plate moves through the opening 116 in the bottom of the inner compartment 50 because the top surface 117 in the outer compartment pulls the exposed photograph plate out of the inner compartment. In so doing, the exposed photographic plate is also guided past the guide 94 which is in a stationary position. As the exposed plate slides free of guide 94 and into the outer compartment 48, the springs 68 in the outer compartment bear against the edges of the plate 18 and urge the plate to the left of the outer compartment 48.

In order to reposition the exposed photographic plate, the handle is again pivoted to move the outer compartment to the retracted position so that the exposed photographic plate now moves through opening 117 into the inner compartment. As the exposed photographic plate moves into the inner compartment again, spring 62 is additionally compressed.

As the plate continues its travel into the inner compartment, the top of the plate strikes the bottom of slide member 80 to move the slide member also to its extended position. The movement of slide member 80 causes it to engage the extension 112 on U-shaped member 98. The finger-shaped member 96 is then moved against the tension of spring 100. The latch 56 disengages automatically from projection 109 so that the outer and inner compartments are again joined by the bolt 52 which locks them together.

By repeating this series of steps the other plates 18 may be exposed and also repositioned.

There is no danger of a double exposure in using the cassette as described above. After the last picture has been taken, the cassette may be locked by known stop mechanisms to prevent the double exposure of the plate which has been exposed first.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

I claim:

1. A front end camera for an electron microscope comprising a camera housing, means mounting said camera housing on the front end of said microscope, a cassette containing photographic plates mounted in the interior of said housing including an inner compartment for containing said photographic plates, an outer compartment telescoped on said inner compartment, latching means for locking said compartments together, means for moving one of said compartments from the normal position in the interior of said camera housing to an extended position intercepting the electron beam of the microscope in order to selectively expose and retract said plates to the normal position thereof, a guide member displaceable into said inner compartment for separating an exposed plate from adjacent unexposed plates, means in said compartments for repositioning said plates when said compartments are extended and retracted, and a release mechanism on said cassette including a slide member displaced by engagement of an exposed photographic plate during repositioning thereof, and an escape mechanism including a finger-like member mounted on said camera housing adjacent said guide member, said finger-like member being pivotally mounted at one end thereof on said housing, a resilient member connected to said finger-like member for urging the latter into a predetermined position, said finger-like member being engageable with said latching means for operating the same, means for securing said inner compartment to the mounting for said finger-like member when said latching means is disengaged so that the outer compartment may be freely displaced toward the extended position thereof, said release mechanism being operably engageable with said finger-like member for disengaging said latching means from the support for the finger-like member.

2. A front end camera for an electron microscope as claimed in claim 1 in which said latching means includes a slide member having a recess therein, a projection on the support for said finger-like member, said projection being engageable with the recess in said actuating lever, another resilient member mounting said latching means and urging the same into the position in which said outer and inner compartments are locked together, the leverage in said finger-like member being sufficient to lock the slide member on said projection when the latching means is urged into engagement with said finger-like member.

3. A front end camera for an electron microscope as claimed in claim 1 further comprising a mounting plate in which the finger-like member, the projection for linking the actuating arm thereto, and the guide member are mounted on said mounting plate, said mounting plate being detachably mounted to said housing.

4. A front end camera for an electron microscope as claimed in claim 1 in which the housing includes guide surfaces thereon, the means mounting the cassette for extending and retracting the same including a slotted band on the outer compartment, said band being slidably engageable with the guide surface in the camera housing, a cam in the slots of said band for engaging the surfaces defining said slots and for moving said cassette into extended and retracted positions.

5. A front end camera for an electron microscope as claimed in claim 1 in which said camera housing has an edge including a packing therein for engaging said front-end camera with an air-tight seal, said housing enclosing a cone-shaped electron beam from said microscope, a hollow projecting enclosure in said housing extending at right angles to the exis of said electron beams including guide surfaces therein for containing and guiding a cassette slidably mounted therein, an air-tight closure means on the open end of said projecting enclosure, and said housing including a viewing screen on an end thereof substantially at right angles to the central axis of said beams and intercepting said cone-shaped beam.

References Cited in the file of this patent
UNITED STATES PATENTS

| | | |
|---|---|---|
| 2,356,963 | Young | Aug. 29, 1944 |
| 2,463,878 | Johnson | Mar. 8, 1949 |
| 2,483,578 | Gallistel | Oct. 4, 1949 |